United States Patent [19]

Dahlstrom et al.

[11] 4,076,131
[45] Feb. 28, 1978

[54] INDUSTRIAL ROBOT

[75] Inventors: Lars Dahlstrom; Bengt Nilsson, both of Vasteras, Sweden

[73] Assignee: Allmanna Svenska Elektriska Aktiebolaget, Vasteras, Sweden

[21] Appl. No.: 692,553

[22] Filed: Jun. 3, 1976

[30] Foreign Application Priority Data

Jun. 16, 1975  Sweden .............................. 7506848

[51] Int. Cl.² .............................................. B25J 9/00
[52] U.S. Cl. ............................ 214/1 BC; 214/1 BD; 214/1 CM; 214/147 T
[58] Field of Search ............. 214/1 CM, 1 BC, 1 BD, 214/1 BH, 147 T

[56] References Cited

U.S. PATENT DOCUMENTS

| | | | |
|---|---|---|---|
| 3,247,978 | 4/1966 | Neumeier | 214/1 CM |
| 3,422,965 | 1/1969 | Lloyd | 214/1 CM |
| 3,618,786 | 11/1971 | Fick | 214/1 CM |
| 3,845,284 | 10/1974 | Taguchi | 214/1 CM X |

*Primary Examiner*—Albert J. Makay
*Assistant Examiner*—George F. Abraham
*Attorney, Agent, or Firm*—Watson, Cole, Grindle & Watson

[57] ABSTRACT

An industrial robot has a movable arm and a tool mounted on the arm and connected thereto so as to be movable with at least one degree of freedom relative to the arm, and transducers are arranged to sense the position of the tool relative to the arm and to regulate control means for the positioning of the tool. The connecting means may permit movement in a plurality of directions, and this movement takes place against prestressed spring members so that movement only takes place when the force causing the movement exceeds a minimum value.

17 Claims, 19 Drawing Figures

INDUSTRIAL ROBOT

BACKGROND OF THE INVENTION

1. Field of the Invention

The present invention relates to an industrial robot with a movable arm and with a tool mounted on the arm.

2. The Prior Art

With most robot systems now known the range of application is limited by the requirement for well-defined collection and delivery points for handling workpieces and because when workpieces are to be machined they must be substantially identical.

Furthermore, slight alterations in position caused by repair work or replacement of the robot or the fixtures entail reprogramming the robot which, in the case of complicated movement patterns, results in a considerable drop in production.

These and other limitations in current robot systems, manipulating machines and similar arrangements in which a movement is transmitted between two elements movable in relation to each other, can be vastly reduced by the introduction of adaptive control which enables the use of simpler collection and delivery stores, permits or improves manipulation and machining of workpieces which are not identical, reduces the requirement of exactitude in setting up workpieces, reduces the need for manual control, enables automatic assembly, enables automatic control and correction of the work program for the robot, enables stacking and lay-out of a large number of workpieces with limited memory capacity in the robot system, reduces the programming work of the operator and reduces the engineering work for each installation.

The field of application for adaptive control can be divided into two groups. In the first group, an adaptive system constitutes an alternative solution to a conventional system. In this case the choice is dependent partly on the total cost for installation and on the capacity of the machine in question (for a robot system, the cycle time). In certain applications having an extremely short cycle time, the adaptive control may make the system too slow. The influence exerted by the adaptive control on the rapidity of the system is partly dependent on the type of adaptivity desired.

The second group comprises fields in which an adaptive system is the only possible alternative. An example of this is automatic machining of work pieces which are not identical.

Figure 1:
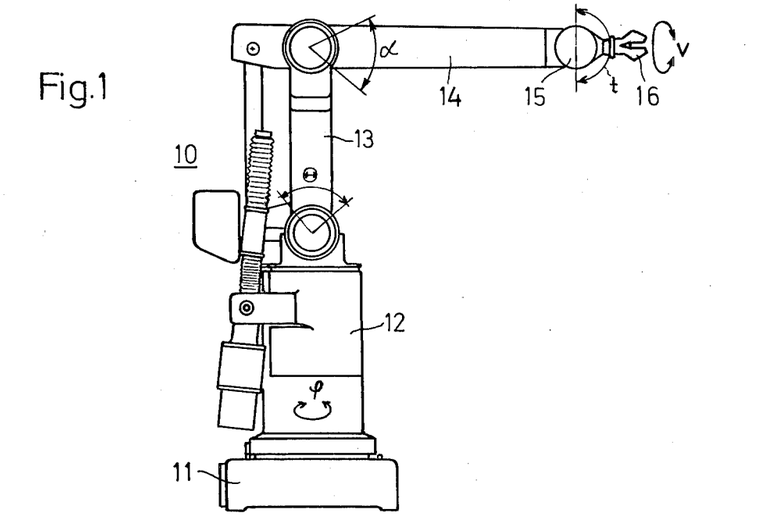
Figure 2:
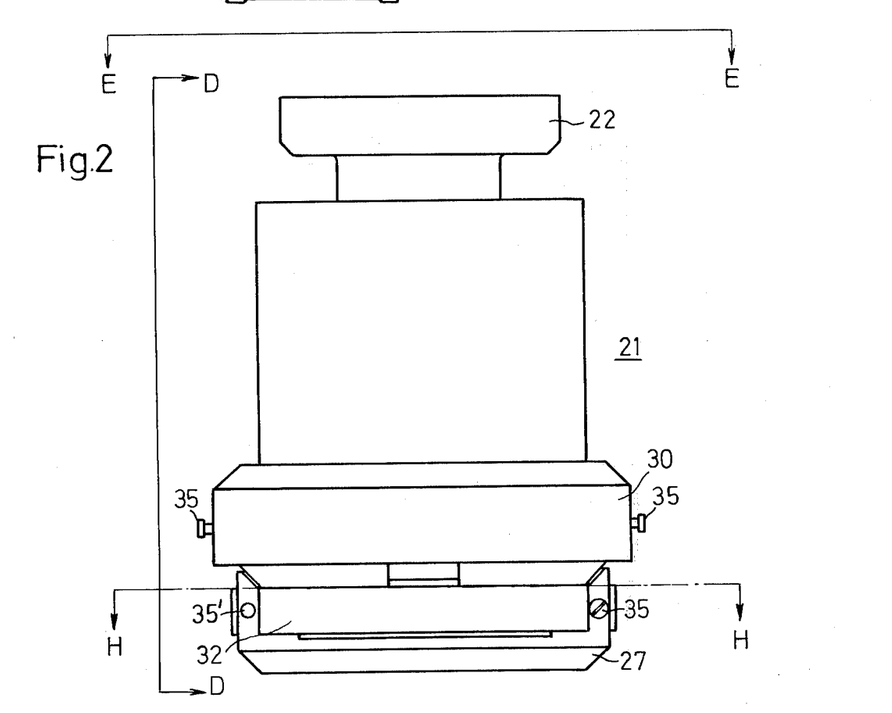
FIGS. 2–8 show an embodiment by way of example of the mechanical construction of such a connecting means, FIG. 3 showing a view in the direction D-D of FIG. 2, FIG. 4 showing a view in the direction E-E of FIG. 2, FIG. 5 showing a section on the line F-F of FIG. 4, FIG. 6 showing a section on the line G-G of FIG. 4, FIG. 7 showing a section on the line H-H of FIG. 2 and FIG. 8 showing a section on the line I-I of FIG. 6.
Figure 3:
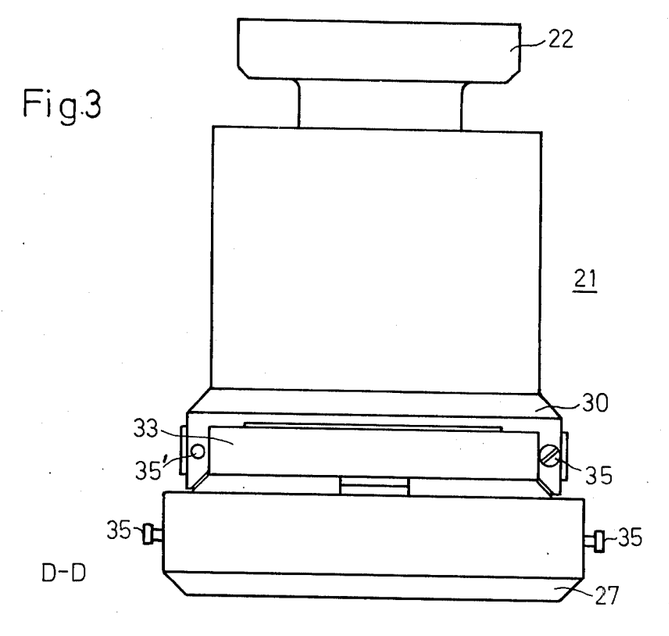
Figure 4:
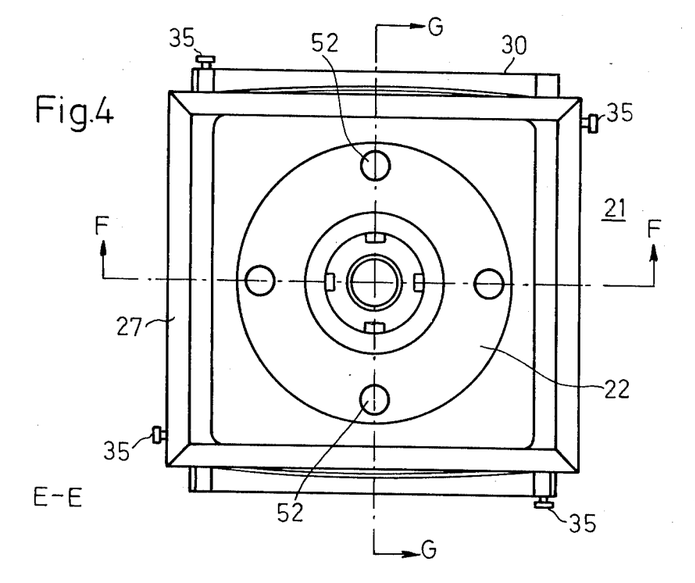
Figure 5:
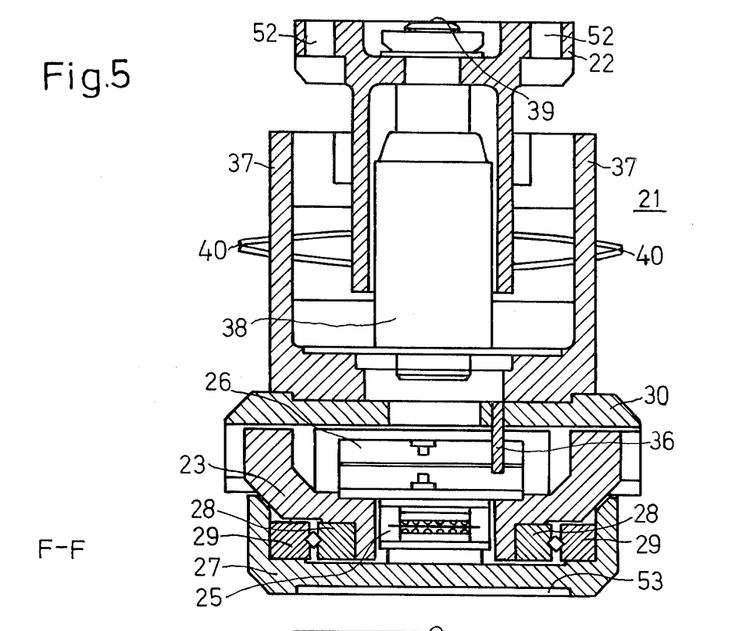
Figure 6:
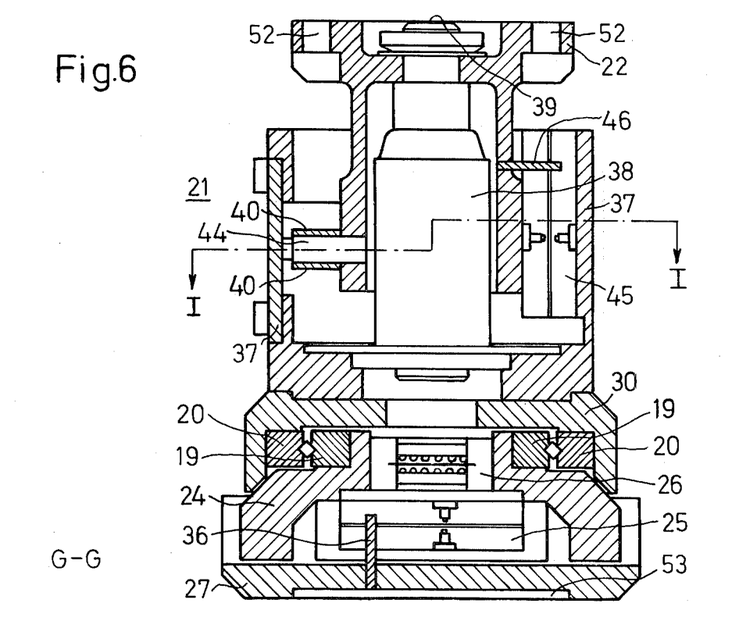
Figure 7:
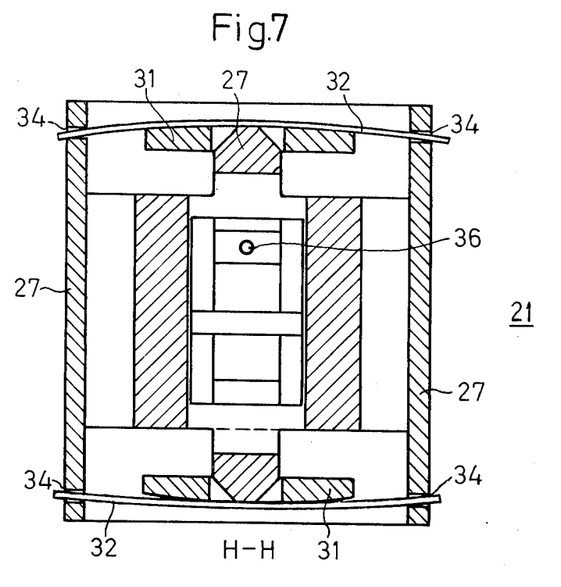
Figure 8:
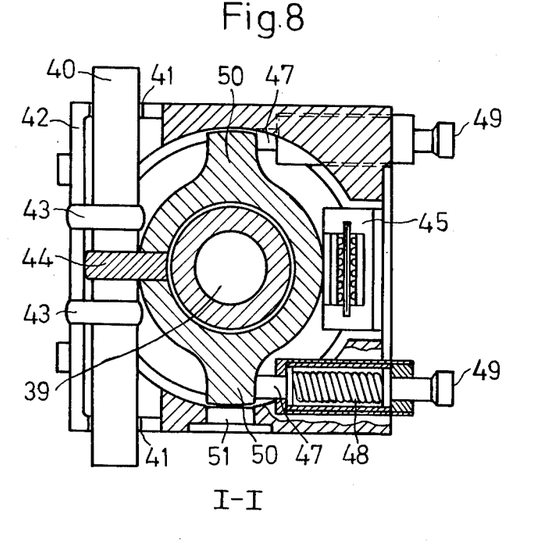
Figure 9:
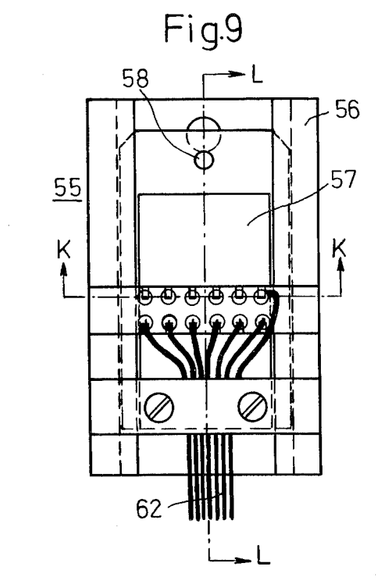
FIGS. 9-12 show an embodiment of an optical transducer included in the connecting means, FIG. 10 showing a section on the line K-K of FIG. 9, FIG. 11 showing a section on the line L-L of FIG. 9 and FIG. 12 showing an example of a code card included in the transducer.
Figure 10:
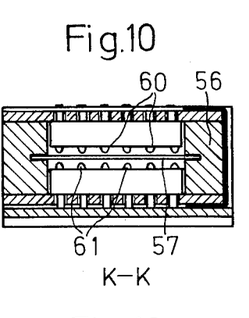
Figure 11:
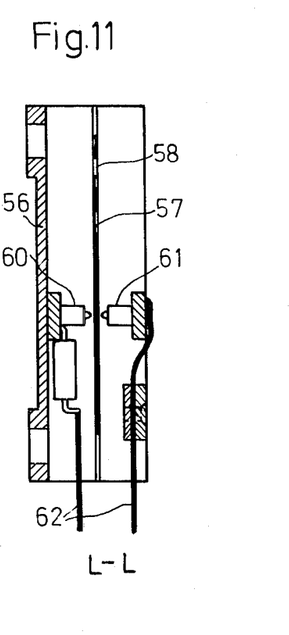
Figure 12:
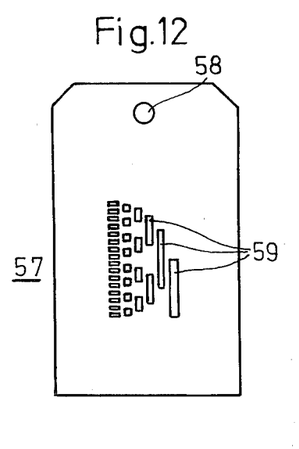

FIG. 1 of the enclosed drawings shows a robot 10 comprising a stand 12 rotating ($\varphi$) on a pedestal 11 and a lower arm 13 movable ($\theta$) with respect to the stand 12, an upper arm 14 movable ($\alpha$) with respect to the lower arm 13 and a tiltable ($t$) wrist 15 with a pivotable ($v$) tool attachment-piece 16.

The robot 10 thus operates in accordance with an anthropomorphic coordinate system having five degrees of freedom $\alpha$, $\theta$, $\varphi$, $t$ and $v$. Such a robot is suitably programmed by the so-called training method, i.e. the robot arm 14 is moved manually to the desired position, whereupon the arm coordinates in this position are stored in a memory arranged for the control system of the robot.

The movement pattern of the robot thus consists of a number of discrete points. Movement between these points can occur in various ways. One possibility is equal motor speed on all the coordinate axes, which often results in the running times for respective coordinates being different. Another possibility is similar running time, which means that the movement between the points will be a regular curve.

Thus any chance the operator has of influencing the movement between two programmed points is strictly limited. When programming in a movement pattern the operator generally has to arrive at the requisite number of points by means of trial and error. This means that programming and correcting complex movement patterns is extremely time-consuming.

In the case of a circular movement, for example, a large number of points must be programmed in order to obtain good continuity of movement.

SUMMARY OF THE INVENTION

An industrial robot according to the present invention enables adaptive control in such systems.

The robot comprises a connecting means, which is designed as a flexible coupling link between the tool attachment on the robot arm and the tool. The relative movement between robot arm and tool is recorded by a displacement transducer. The force exerted on the wrist part is directly proportional to the size and direction of the relative movement. The proportionality constant consists of the spring constant of the plate springs built into the connecting means. The plate springs can easily be changed, which means that for each application the sensitivity of the connecting means can be optimized.

BRIEF DESCRIPTION OF THE DRAWINGS

Since the connecting means makes use of the forces exerted on the wrist part of the robot arm to guide a robot according to FIG. 1, for instance more general control functions can be introduced, which considerably facilitate the programming work of the operator. It is also possibly to completely automize certain sections of the programming work. Furthermore, a robot is obtained which can record and automatically adjust to alterations arising in the system in which it is included.

The connecting means can measure the force or pressure exerted by the robot on an object. Furthermore, through the movement of the tool in relation to the robot arm its position or speed in relation to an object can be measured, or conversely the deviation of the object from a certain predetermined position or movement pattern can be measured.

Because of the flexibility the connecting means also protects the center of the wrist against impermissibly great mechanical stress which can occur when the robot is to grip a workpiece or place a workpiece in a store.

The connecting means is modular in that it can either be constructed for only 2° of freedom $x$ and $y$, or only $z$ and $w$, or with all 4° of freedom $x$, $y$, $z$ and $w$.

A robot with connecting means according to the invention will be further described with reference to the accompanying drawings in which.

DESCRIPTION OF THE PREFERRED EMBODIMENTS

The connecting means 21 according to FIGS. 2-8 comprises a tool attachment 22 and a bearing cross consisting of a lower part 23 directed upwardly and an upper part 24 directed downwardly where transducers 25 and 26, respectively, are fitted for the x and y coordinates. Between the lower part 23 of the bearing cross and an outer attachment plate 27 is a linear, recessed roller bearing, the halves 28 and 29 being secured to the lower part 23 of the bearing cross and to the attachment plate 27 respectively. Between the upper part 24 of the bearing cross and an inner attachment plate 30 is a linear, recessed roller bearing, the halves 19 and 20 being secured to the upper part 24 of the bearing cross and to the inner attachment plate 30, respectively.

Together with the lower and upper parts 23 and 24 of the bearing cross, therefore, the two attachment plates 27 and 30 form a unit which permits movement in both x and y directions. The movement is limited by permanent stops 31 arranged in the attachment plates 27 and 30. The movement in the x direction is thus limited by stops secured to the attachment plate which is movable in the y direction, and vice versa. The stops 31 also constitute clamping points for the pair of plate springs 32 and 33 pertaining to the x and y coordinates, respectively. The ends of the plate springs 32 and 33 are inserted through notches 34 in the attachment plates 27 and 30, respectively. The plate springs 32 and 33 are locked in the notches 34 by means of screws 35 through holes in the plate springs. The screws 35 snap into the holes in the plates springs when they are in the correct position. The screws are set in threaded holes 35' in the plates 27 and 30.

By prestressing each plate spring to a certain force, the force required to displace the parts of the bearing cross from their O positions can be determined.

In principle the bearing cross is designed to be clamped without clearance between the plate springs. Normal loads can then be handled without displacements occurring. However, if an obstacle is encountered the attachment plate for the coordinate in question will be displaced in relation to the force applied by the sensor carrier. The movements are transmitted by cylindrical pins 36 in the attachment plates to code cards in the transducers 25 and 26, which will be described in more detail below, which by their movement indicate the position to the control equipment.

A bearing casing 37 is secured to the outer attachment plate 30.

A linear, and at the same time rotating bearing 38 is fitted in the bearing casing 37, the tool attachment 22 being fitted to the shaft 39 of said bearing. The tool attachment 22 is thus displaceable in z direction and pivotable, w movement. In the same way as for the x and y movements, the z movement has a O position which is defined by a pair of tensioned plate springs 40 and a certain force is therefore required for displacement from the O position.

The plate springs 40 are fitted in notches 41 on a spring attachment 42 and are tensioned over cylindrical pins 43. The spring attachment 42 is secured to the bearing casing 37.

Between the pins 43 is a pin 44, secured to the tool attachment 22, which transmits movement in z direction to the plate springs 40. The plate springs 40 are locked by wire elements somewhat like paper-clips in the notches 41.

The transducer 45 for the z coordinate is fitted on one side of the bearing casing 37 and a cylindrical pin 46 connects the code card to the tool attachment 22. The hole in the code card for the pin 46 is in the form of a slot to permit a certain turning movement of the tool attachment 22.

The turning movement w is loaded and limited by pressure rods 47 and by springs 48, the tension of which can be adjusted by an adjusting member 49. The pressure rods 47 act on bosses 50 arranged in the tool attachment 22. The turning positions are indicated by an inductive transducer 51 arranged in the bearing casing 37.

A recess 52 is provided in the tool attachment 22 for the attachment device for the tool to be used and a recess 53 and apertures (not shown) are provided in the outer attachment plate 27 for attachment means for mounting the connecting means.

The inductive transducer is preferably one of a type similar to Siemens FP 200 L 100.

The displacement transducer 55 according to FIGS. 9-12 for each of the coordinates x, y and z, comprises a sleeve-shaped holder 56 into which a code card 57 is intended to be inserted. The code card 57 is connected to the appropriate coordinate by pins 36 and 46 passed through the hole 58 in each code crd 57. The code card 57 contains transparent code signs 59, the length, position and combination of these signs forming a code indicating the current position of the code card.

A number of light sources 60 (in this case six) is arranged in a row in the transducer 55 in order to read the code card 57. These light sources are preferably light diodes and on the opposite side of the card 57 is an equivalent number of light detectors 61, preferably photo-transistors. The light sources 60 and light detectors 61 thus function as an optical reading fork. Connection leads 62 are also provided for the light sources 60 and light detectors 61.

Figure 13:
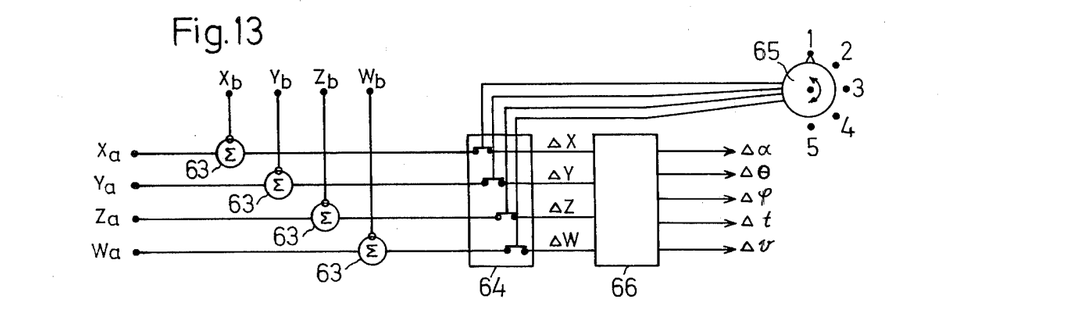
FIGS. 13 and 14 show schematically an example of signal processing measured signals emitted from the connecting means, and finally

FIG. 13 shows how the output signals $x_a$, $y_a$, $z_a$ and $w_a$ from respective transducers are supplied to difference forming means 63 together with desired values $x_b$, $y_b$, $z_b$, and $w_b$ set by an operator. The difference signals $\Delta x$, $\Delta y$, $\Delta z$ and $\Delta w$ are thus obtained from the difference forming means 63 and are supplied to a selecting device 64 which only passes on the difference signals required for the function concerned, which is controlled by the operator via a function selecting device 65. When the output signals $x_a$, $y_a$, $z_a$ and $w_a$ differ from the set desired values $x_b$, $y_b$, $z_b$ and $w_b$ the movement of the robot is adjusted and/or interrupted depending on the choice of function. If adjustment is desired the difference signals are supplied to a coordinate transformer 66. The following output signals are then obtained from the coordinate transformer $$\Delta \alpha = f(\Delta x, \Delta y, \Delta z, \Delta w, \alpha, \theta, \varphi, t, v)$$

$$\Delta \theta = f(\Delta x, \Delta y, \Delta z, \Delta w, \alpha, \theta, \varphi t, v)$$

$$\Delta \varphi = f(\Delta x, \Delta y, \Delta z, \Delta w, \alpha, \theta, \varphi, t, v)$$

$$\Delta t = f(\Delta x, \Delta y, \Delta z, \Delta w, \alpha, \theta, \varphi, t, v)$$

$$\Delta v = f(\Delta x, \Delta y, \Delta z, \Delta w, \alpha \theta, \varphi, t, v)$$

These output signals are then supplied to the control member of the robot so that the desired movement or rate of movement is obtained.

Figure 14:
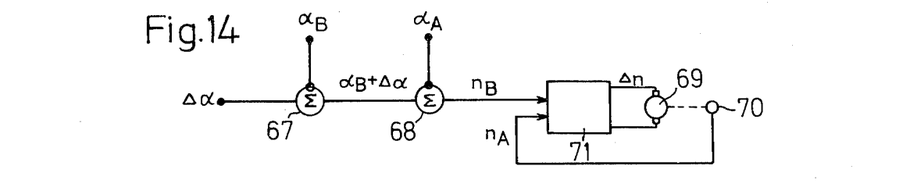

FIG. 14 shows schematically the control system for one of the coordinates, namely $\alpha$. Similar control systems can be used for the other coordinates, $\theta$, $\phi$, $t$ and $v$.

The output signal $\Delta \alpha$ is fed to a summator 67, together with the desired value $\alpha_B$, set by the operator, the signal $\alpha_{B + \Delta\alpha}$ then being obtained. This is in turn fed to a difference forming means 68 for comparison with a real value $\alpha_A$ for the coordinate $\alpha$, measured by a resolver (not shown).

An error signal $n_B$ is obtained from the difference forming means 68, this signal constituting the speed reference to the drive motor 69 of the $\alpha$ coordinate. The error signal $n_B$ is fed together with a value $n_A$ measured by a tachometer 70 and which is the actual speed of a drive means 71 for the motor 69.

The drive means 71 controls the direction and movement of the motor 70 with respect to the deviation which has arisen.

The following is a description of one application of a robot in accordance with the above in order to further illustrate its advantages.

Figure 15:
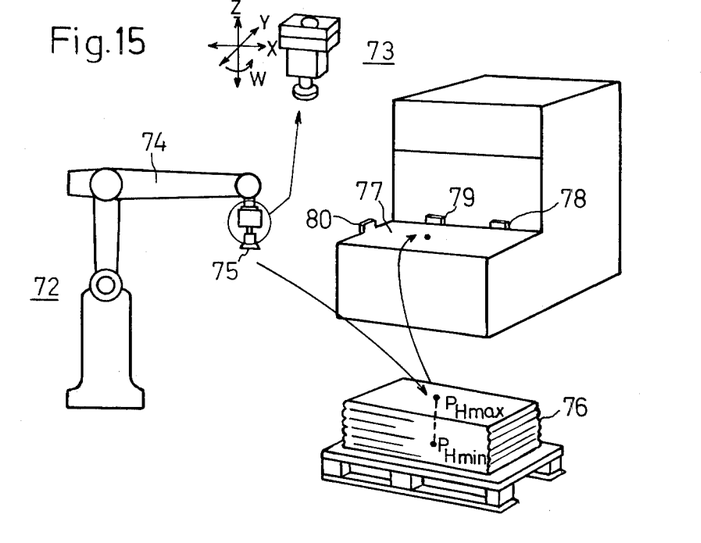
FIGS. 15-19 show an example of application for a robot provided with a connecting means according to the invention.
Figure 17:
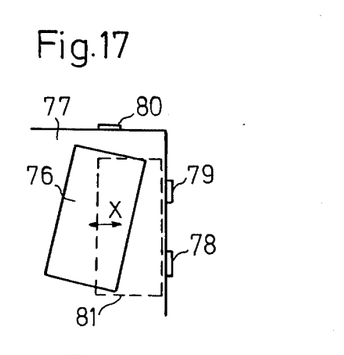

A robot 72 operating with the coordinates, $\alpha, \theta \phi, t$ and $v$ is provided with a connecting means 73 in accordance with the above between the upper robot arm 74 and the tool 75. The robot 72 is supposed to move sheets of metal 76 from a stack to a work table 77 and the tool 75 therefore consists of a suction cup. The work table 77 is provided with stops 78, 79 and 80 to position the sheets 76. The desired position of the sheet 76 is indicated on the work table 77 in FIGS. 17 and 18 by a rectangle 81 drawn in broken lines.

It is assumed that the dimensions of the sheets of metal are such that deviation of the stack from a nominal position will not affect the gripping function. In order to reduce the number of positioning movements required in the collecting position that searching is only performed along a vertical line, i.e. irrespective of the number of sheets in the stock, only the highest and lowest points need be programmed in.

The robot arm 74 is moved to a point $P_{Hmax}$ located slightly above the highest level allowed for the stack, after which the position of the robot arm is programmed in. The lowest level $P_{Hmin}$ is programmed in next with the instruction sensor control along the curve programmed in.

In the sensor instruction it is stated that the transducer in z direction shall be used for the movement between $P_{Hmax}$ and $P_{Hmin}$ and that the movement shall be interrupted with correction for the time-lag when the relative movement between robot arm and suction cup exceeds the value programmed in.

The design of the connecting means and the correction for time-lag means that a speed of one or a few decimeters per second between $P_{Hmax}$ and $P_{Hmin}$ can be used without risk of the mechanical stresses being too great when the suction cup 66 comes into contact with the uppermost sheet of metal.

When the sheet has been gripped the transducer in z direction can be used to check that the sheet of metal is retained during movement to the delivery position.

The robot arm is then moved to point $P_L$ over the work bench, after which its real value is programmed. The point $P_L$ is selected taking into consideration position errors at the collection point so that the metal sheet does not come into contact with any object in the delivery position. Correction in $x$, $y$, $z$ and $w$ directions is required for positioning of the sheet in the delivery point.

Figure 16:
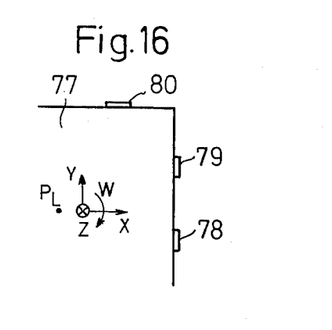

After the robot tool has assumed position $P_L$ the robot is controlled by signals from the sensors in $x$ and $w$ direction. See FIGS. 16 and 17. When the metal sheet 76 is in the desired position, i.e. in contact with both the stops 78 and 79 (see FIG. 18), control is taken over by signals from the sensors in $x$, $y$ and $w$ directions. When contact has been obtained with all the stops 78, 79 and 80 (see FIG. 19), the robot will be guided by signals from all the sensors towards the surface 77.

Figure 18:
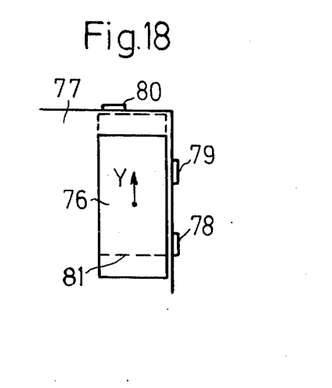
Figure 19:
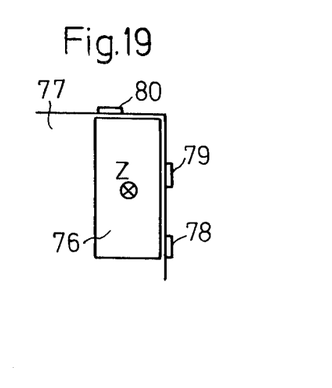

Positioning of the plate at the delivery point can be simplified or made more complicated. The complexity of the searching process is dependent on factors at the delivery station and also on the nature of the metal sheets. If there is a risk of the metal sheet getting caught on one of the bosses 78 or 79 because of burrs on the metal sheet, the robot will investigate whether the sheet has come into contact with the boss 80 by performing a limited search in negative $x$ direction.

It is assumed that the boss 80 has been located if the pressure against this does not alter noticeably during this search. If the search in $y$ direction is interrupted because the sheet has caught on the stop 78 or 79, the force in $y$ direction will disappear when the sheet is moved in negative $x$ direction. If there is no risk of the sheet becoming caught, or if only a slight correction of the position in point $P_L$ is required, searching need only be programmed in along for instance x direction, control from all transducers.

It has been assumed that the location of the suction cup in the collecting station is not critical.

If great precision is required for picking up the sheets at the collection station, but the stacks are to be placed with low precision, the problem can be solved by using a scanning process to locate the stack and thereby the gripping point. In this case the scanning process may be selected so that a more comprehensive and thus time-consuming search is only required to locate the first sheet.

Robots now in use require the collection and delivery stations to be well defined and the work pieces identical. This places considerable demands on the part-systems in the process, such as robots, stores, manipulators, etc. The increased cost to achieve exactly positioned work pieces in comparison with substantially positioned work pieces may in certain cases exceed the cost of obtaining adaptive control. This is often the case when handling short series.

As well as the automatic adjustment possible with an adaptive system, it also offers more advanced supervision of the process. The advantages with more advanced supervision may in some cases be of such importance that even in applications in which the robot of today can easily be adapted, an adaptive system may well be preferred.

The robot according to the invention is of course not limited to the embodiment shown here. It can be varied in many ways within the scope of the accompanying claims.

We claim:

1. Industrial robot comprising a movable arm part, a tool part including a tool, connecting means flexibly mounting the tool part on the arm part for movement with at least one degree of freedom relative to the arm thereby reducing mechanical stresses when the tool comes into contact with a workpiece or other obstacle, displacement transducer means associated with one of the parts to sense the position of the tool relative to the arm, and to generate a signal ($x_a$) corresponding to said position, automatic control means for moving the arm part, and means for transmitting said signal to said control means for moving the arm part in dependence upon said position.

2. Industrial robot according to claim 1, wherein said means for transmitting the transducer signal includes means for generating the difference ($\Delta x$) between the actual tool position ($x_a$) and a desired position ($x_b$) and means for transmitting said difference to the control means.

3. Industrial robot according to claim 2, wherein said control means being arranged to move the arm part so as to decrease said difference.

4. Industrial robot according to claim 1, wherein said means for transmitting the transducer signal to the control means comprises coordinate transformation means for transforming the tool position from a transducer coordinate system ($x, y, z, w$) to a coordinate system ($\alpha, \theta, \phi, t, v$) used in moving the robot arm.

5. Industrial robot according to claim 1, in which the connecting means mounts the tool for movement with a plurality of degrees of freedom with respect to the arm, and the transducer means comprises a transducer for each of said degrees of freedom.

6. Industrial robot according to claim 1, in which the connecting means includes means mounting the tool for translatory movement relative to the arm in at least one direction.

7. Industrial robot according to claim 1, in which the connecting means includes means mounting the tool for translatory movement relative to the arm in at least two directions perpendicular to each other.

8. Industrial robot according to claim 1, in which the connecting means comprises a first mechanical unit which is flexibly movable with said degree of freedom in relation to its other parts, and a first displacement transducer arranged to detect said movement of said first unit.

9. Industrial robot according to claim 8, in which the connecting means comprises a second mechanical unit which is flexibly movable with a second degree of freedom in relation of its other parts, and a second displacement transducer arranged to detect said movement of said second unit, the second degree of freedom being perpendicular to the first degree of freedom.

10. Industrial robot according to claim 9, in which the connecting means comprises a third mechanical unit which is flexibly movable with a third degree of freedom in relation to its other parts, and a third displacement transducer arranged to detect the movement of said third unit, which movement is constituted by a rotating movement around an axis parallel or perpendicular to said first degree of freedom.

11. Industrial robot according to claim 8, in which said first unit comprises a mechanical element which is movable between two plate springs clamped parallel to each other.

12. Industrial robot according to claim 9, in which said second unit comprises a mechanical element which is movable between two clamped plate springs.

13. Industrial robot according to claim 10, in which said third unit comprises a rotatable unit clamped against a resilient stop.

14. An industrial robot comprising a movable arm part, a tool part, connecting means flexibly mounting the tool part on the arm part for movement with at least one degree of freedom relative to the arm for reducing mechanical stresses when the tool part comes into contact with a workpiece or other obstacle, the connecting means including prestressed spring members for preventing movement in one degree of freedom until the force causing the movement exceeds a minimum value determined by the prestress, and displacement transducer means associated with the connecting means to sense the position of the tool relative to the arm and to generate a signal corresponding to said position, automatic control means for moving the arm part, means for transmitting said signal to said control means for moving the arm part in dependence upon said position.

15. Industrial robot according to claim 14, for carrying out a work operation on a workpiece, in which the prestress is such that a relative movement between the tool and the arm during normal working conditions only occurs if the tool comes into contact with the workpiece or other obstacle.

16. Industrial robot according to claim 14, for handling a workpiece, in which the prestress is such that a relative movement between the tool and the arm only occurs if the workpiece has been gripped and/or the workpiece or the tool comes into contact with an obstacle.

17. Industrial robot according to claim 14 in which the prestressed spring members are plate springs.

* * * * *